United States Patent
Bingol et al.

(10) Patent No.: US 10,057,376 B2
(45) Date of Patent: Aug. 21, 2018

(54) REMOTE DESKTOP PROTOCOL CLIENT WITH VIRTUAL CHANNEL SUPPORT IMPLEMENTED IN A STANDARDS-BASED WEB BROWSER

(71) Applicant: Dell Products L.P., Round Rock, TX (US)

(72) Inventors: Evren Bingol, San Francisco, CA (US); Curtis J. Schwebke, Los Gatos, CA (US)

(73) Assignee: Dell Products L.P., Round Rock, TX (US)

( * ) Notice: Subject to any disclaimer, the term of this patent is extended or adjusted under 35 U.S.C. 154(b) by 251 days.

(21) Appl. No.: 14/928,109

(22) Filed: Oct. 30, 2015

(65) Prior Publication Data

US 2017/0126842 A1    May 4, 2017

(51) Int. Cl.
| | |
|---|---|
| G06F 15/16 | (2006.01) |
| H04L 29/06 | (2006.01) |
| H04L 29/08 | (2006.01) |
| G06F 17/30 | (2006.01) |

(52) U.S. Cl.
CPC ........ H04L 67/38 (2013.01); G06F 17/30979 (2013.01); H04L 67/02 (2013.01); H04L 69/162 (2013.01)

(58) Field of Classification Search
CPC ....... H04L 67/38; H04L 69/162; H04L 67/02; G06F 17/30979
See application file for complete search history.

(56) References Cited

U.S. PATENT DOCUMENTS

| | | |
|---|---|---|
| 6,873,625 B1 | 3/2005 | Yoo |
| 7,839,860 B2 | 11/2010 | Kobayashi |
| 7,853,121 B2 | 12/2010 | Yahata |
| 8,509,555 B2 | 8/2013 | Meany |
| 8,887,060 B2 | 11/2014 | Maity |
| 9,628,810 B1 | 4/2017 | Bingol |
| 2009/0125636 A1 | 5/2009 | Li |
| 2010/0070634 A1* | 3/2010 | Ranjan ................ H04L 63/0869 709/228 |
| 2010/0299701 A1* | 11/2010 | Liu .................... G06F 17/30053 725/39 |
| 2013/0080865 A1 | 3/2013 | Palm |
| 2014/0040767 A1 | 2/2014 | Bolia |
| 2014/0185950 A1 | 7/2014 | Saint Macary |
| 2015/0207904 A1 | 7/2015 | Siegman |
| 2017/0126775 A1 | 5/2017 | Bingol |
| 2017/0126776 A1 | 5/2017 | Bingol |

* cited by examiner

*Primary Examiner* — Padma Mundur
(74) *Attorney, Agent, or Firm* — Baker Botts L.L.P.

(57) ABSTRACT

An RDP server may query a web client to determine one or more capabilities of the web client. The RDP server may receive a packet from the web client that indicates the one or more capabilities of the web client. The RDP server may identify one or more applications running on a remote machine to be accessed by the web client. The RDP server may provide one or more virtual channels between the RDP server and the web client. The one or more virtual channels may each be associated with an identified application running on the remote machine and a capability of the web client. The virtual channels may be provided to facilitate the generation of an interface for viewing and interacting with content of the remote machine at the web client.

20 Claims, 5 Drawing Sheets

REMOTE DESKTOP PROTOCOL CLIENT WITH VIRTUAL CHANNEL SUPPORT IMPLEMENTED IN A STANDARDS-BASED WEB BROWSER

TECHNICAL FIELD

This disclosure relates generally to implementation of virtual channel support in a web browser, for example, a standards-based web browser, at a remote desktop protocol client (RDP) and, more particularly, to providing virtual channel support for a RDP client by utilizing a cross-platform scripting language.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more information handling systems, data storage systems, and networking systems.

Traditionally remote desktop protocol (RDP) clients are written using a native, full-featured programming language such as C or C++. In such an environment, the native RDP client can use a dedicated thread to handle each virtual channel. An equivalent, multi-threading environment is not provided within a standards-based web browser or scripting environment, such as JAVASCRIPT, at an RDP client. Handling all virtual channels using a cross-platform scripting language, such as JAVASCRIPT, RDP client's main thread may not be feasible as the additional processing require may reduce the responsiveness of the RDP client and diminish the user's experience when operations require a heavy utilization of virtual channels. The present invention addresses this issue.

SUMMARY

In one embodiment a remote desktop protocol (RDP) server queries a web client to determine one or more capabilities of a standards-based web browser of the web client. The querying may occur during a capabilities exchange between the RDP server and the web client. The RDP server receives a packet from the web client. The packet comprises an indication of the one or more capabilities of the web client. The number of packets received may be a plurality of packets. The packet may be received over a websocket connection. The packet may be a Protocol Data Unit. The one or more capabilities received in the packet may comprise at least a plug-in. The RDP server identifies one or more applications running on a remote machine to be accessed by the web client and provides one or more virtual channels between the RDP server and the web client, wherein the one or more virtual channels are each associated with at least one of the one or more capabilities that corresponds to at least one of the one or more applications, and wherein the virtual channels are provided to facilitate generation of an interface for viewing and interacting with content of the remote machine at the web client. The one or more virtual channels are limited by the one or more capabilities.

One or more computer-readable non-transitory storage media embodying software that is operable when executed to perform or implement any one or more embodiments. Further, an information handling system may comprise one or more processors, a memory coupled to the processors comprising instruction executable by the processors, and the processors operable when executing the instructions to implement any one or more embodiments.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Offloading virtual channels when possible using web workers and handling virtual channels not suitable for web workers using a cross-platform scripting language client's main processing thread (such as a JAVASCRIPT RDP client's main processing thread) provides for the utilization of virtual channels in a standards-based web browser without diminishing the user's experience. When establishing a connection to a remote desktop protocol (RDP) session, the web server detects or queries the capabilities of the web browser of an RDP client that may utilize virtual channels. For example, the server may query the RDP client for the presence of one or more plug-ins, for example, Adobe Acrobat, Adobe Flash or any other plug-in known to one of ordinary skill in the art. The web server may also seek permission from, for example, a user or a web browser to write to the local file system when redirecting a remote file system to an RDP server.

The cross-scripting language client or platform may implement one or more capabilities of the RDP client for a given virtual channel for the standards-based web browser of the RDP client. If a particular capability does not require access to a document object model (DOM) tree, which includes the hypertext markup language 5 (HTML5) canvas, then an HTML5 web worker is used to implement the virtual channel. A web worker may be a JAVASCRIPT script that can run independently in the background of the RDP client, which permits the virtual channel to function without interfering with the general performance of the standards-based web browser of the RDP client. If a particular capability does require access to the DOM tree, then the virtual channel is implemented on the main cross-platform scripting language client thread. A priority queue is implemented in the cross-platform scripting language client so that virtual channel operations do not slow down the general performance of the standards-based web browser of the RDP client.

Particular embodiments are best understood by reference to FIGS. 1-6, wherein like numbers are used to indicate like and corresponding parts.

Figure 1:
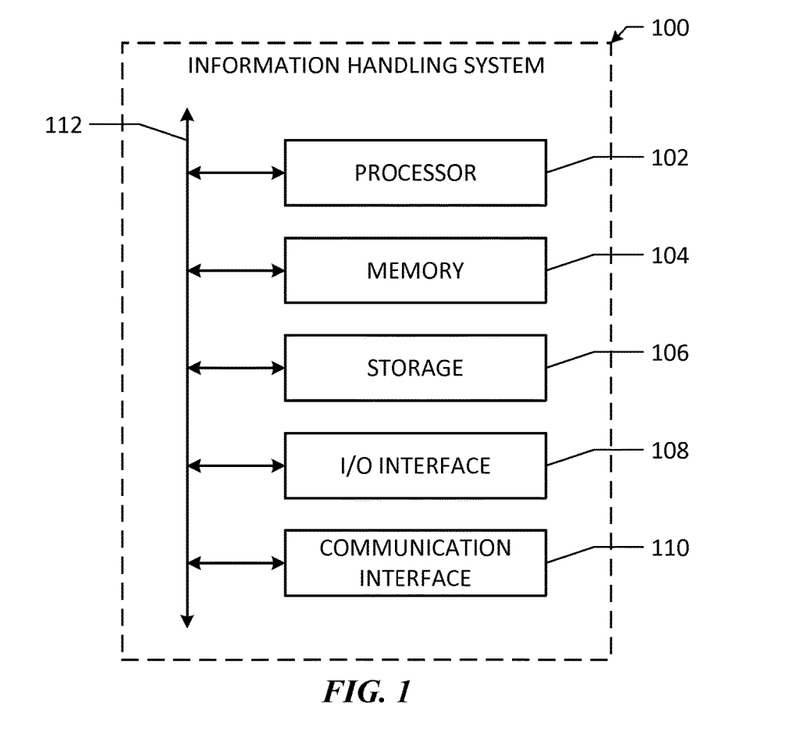
FIG. 1 is a block diagram of selected elements of an information handling system according to one or more embodiments of the present disclosure.

FIG. 1 illustrates an example information handling system 100. In particular embodiments, one or more information handling systems 100 perform one or more steps of one or more methods described or illustrated herein. In particular embodiments, one or more information handling systems 100 provide functionality described or illustrated herein. In particular embodiments, software running on one or more information handling systems 100 performs one or more steps of one or more methods described or illustrated herein or provides functionality described or illustrated herein. Particular embodiments include one or more portions of one or more information handling systems 100. Herein, reference to an information handling system may encompass a computing device, and vice versa, where appropriate. Moreover, reference to an information handling system may encompass one or more information handling systems, where appropriate.

This disclosure contemplates any suitable number of information handling systems 100. This disclosure contemplates information handling system 100 taking any suitable physical form. As example and not by way of limitation, information handling system 100 may be an embedded information handling system, a system-on-chip (SOC), a single-board information handling system (SBC) (such as, for example, a computer-on-module (COM) or system-on-module (SOM)), a desktop information handling system, a laptop or notebook information handling system, an interactive kiosk, a mainframe, a mesh of information handling systems, a mobile telephone, a personal digital assistant (PDA), a server, a tablet information handling system, or a combination of two or more of these. Where appropriate, information handling system 100 may include one or more information handling systems 100; be unitary or distributed; span multiple locations; span multiple machines; span multiple data centers; or reside in a cloud, which may include one or more cloud components in one or more networks. Where appropriate, one or more information handling systems 100 may perform without substantial spatial or temporal limitation one or more steps of one or more methods described or illustrated herein. As an example and not by way of limitation, one or more information handling systems 100 may perform in real time or in batch mode one or more steps of one or more methods described or illustrated herein. One or more information handling systems 100 may perform at different times or at different locations one or more steps of one or more methods described or illustrated herein, where appropriate.

In particular embodiments, information handling system 100 includes a processor 102, memory 104, storage 106, an input/output (I/O) interface 108, a communication interface 110, and a bus 112. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 102 includes hardware for executing instructions, such as those making up a computer program. As an example and not by way of limitation, to execute instructions, processor 102 may retrieve (or fetch) the instructions from an internal register, an internal cache, memory 104, or storage 106; decode and execute them; and then write one or more results to an internal register, an internal cache, memory 104, or storage 106. In particular embodiments, processor 102 may include one or more internal caches for data, instructions, or addresses. This disclosure contemplates processor 102 including any suitable number of any suitable internal caches, where appropriate. As an example and not by way of limitation, processor 102 may include one or more instruction caches, one or more data caches, and one or more translation lookaside buffers (TLBs). Instructions in the instruction caches may be copies of instructions in memory 104 or storage 106, and the instruction caches may speed up retrieval of those instructions by processor 102. Data in the data caches may be copies of data in memory 104 or storage 106 for instructions executing at processor 102 to operate on; the results of previous instructions executed at processor 102 for access by subsequent instructions executing at processor 102 or for writing to memory 104 or storage 106; or other suitable data. The data caches may speed up read or write operations by processor 102. The TLBs may speed up virtual-address translation for processor 102. In particular embodiments, processor 102 may include one or more internal registers for data, instructions, or addresses. This disclosure contemplates processor 102 including any suitable number of any suitable internal registers, where appropriate. Where appropriate, processor 102 may include one or more arithmetic logic units (ALUs); be a multi-core processor; or include one or more processors 102. Although this disclosure describes and illustrates a particular processor, this disclosure contemplates any suitable processor.

In particular embodiments, memory 104 includes main memory for storing instructions for processor 102 to execute or data for processor 102 to operate on. As an example and not by way of limitation, information handling system 100 may load instructions from storage 106 or another source (such as, for example, another information handling system 100) to memory 104. Processor 102 may then load the instructions from memory 104 to an internal register or internal cache. To execute the instructions, processor 102 may retrieve the instructions from the internal register or internal cache and decode them. During or after execution of the instructions, processor 102 may write one or more results (which may be intermediate or final results) to the internal register or internal cache. Processor 102 may then write one or more of those results to memory 104. In particular embodiments, processor 102 executes only instructions in one or more internal registers or internal caches or in memory 104 (as opposed to storage 106 or elsewhere) and operates only on data in one or more internal registers or internal caches or in memory 104 (as opposed to storage 106 or elsewhere). One or more memory buses (which may each include an address bus and a data bus) may couple processor 102 to memory 104. Bus 112 may include one or more memory buses, as described below. In particular embodiments, one or more memory management units (MMUs) reside between processor 102 and memory 104 and facilitate accesses to memory 104 requested by processor 102. In particular embodiments, memory 104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 104 may include one or more memories 104, where appropriate. Although this disclosure describes and illustrates particular memory, this disclosure contemplates any suitable memory.

In particular embodiments, storage 106 includes mass storage for data or instructions. As an example and not by way of limitation, storage 106 may include a hard disk drive (HDD), a floppy disk drive, flash memory, an optical disc, a magneto-optical disc, magnetic tape, or a Universal Serial Bus (USB) drive or a combination of two or more of these. Storage 106 may include removable or non-removable (or fixed) media, where appropriate. Storage 106 may be internal or external to information handling system 100, where appropriate. In particular embodiments, storage 106 is non-volatile, solid-state memory. In particular embodiments, storage 106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 106 taking any suitable physical form. Storage 106 may include one or more storage control units facilitating communication between processor 102 and storage 106, where appropriate. Where appropriate, storage 106 may include one or more storages 106. Although this disclosure describes and illustrates particular storage, this disclosure contemplates any suitable storage.

In particular embodiments, I/O interface 108 includes hardware, software, or both, providing one or more interfaces for communication between information handling system 100 and one or more I/O devices. Information handling system 100 may include one or more of these I/O devices, where appropriate. One or more of these I/O devices may enable communication between a person and information handling system 100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 108 for them. Where appropriate, I/O interface 108 may include one or more device or software drivers enabling processor 102 to drive one or more of these I/O devices. I/O interface 108 may include one or more I/O interfaces 108, where appropriate. Although this disclosure describes and illustrates a particular I/O interface, this disclosure contemplates any suitable I/O interface.

In particular embodiments, communication interface 110 includes hardware, software, or both providing one or more interfaces for communication (such as, for example, packet-based communication) between information handling system 100 and one or more other information handling systems 100 or one or more networks. As an example and not by way of limitation, communication interface 110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 110 for it. As an example and not by way of limitation, information handling system 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Information handling system 100 may include any suitable communication interface 110 for any of these networks, where appropriate. Communication interface 110 may include one or more communication interfaces 110, where appropriate. Although this disclosure describes and illustrates a particular communication interface, this disclosure contemplates any suitable communication interface.

In particular embodiments, bus 112 includes hardware, software, or both coupling components of information handling system 100 to each other. As an example and not by way of limitation, bus 112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 112 may include one or more buses 112, where appropriate. Although this disclosure describes and illustrates a particular bus, this disclosure contemplates any suitable bus or interconnect.

Figure 2:
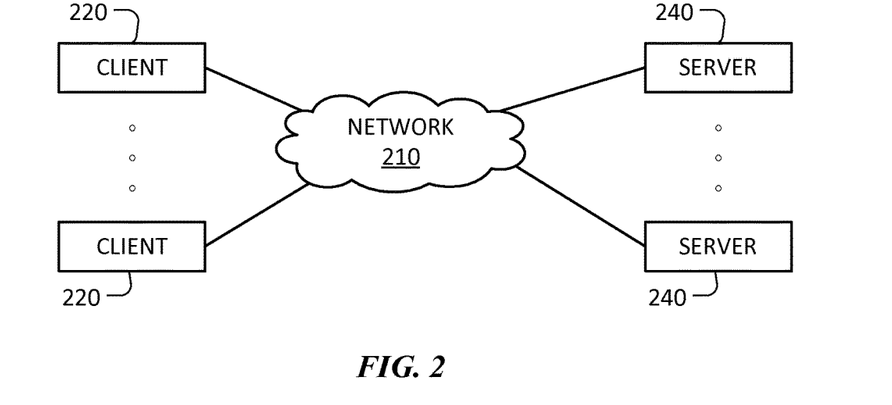
FIG. 2 is an example of a network environment according to one or more embodiments of the present disclosure.

FIG. 2 illustrates an example configuration of networked information handling systems (e.g., client devices and servers). In particular embodiments, one or more clients 220 and one or more servers 240 are connected via network 210. Network 210 may be a public network or a private (e.g., corporate) network. Additionally, network 210 may, for example, be a Local Area Network (LAN), a Wide Area Network (WAN), a wireless network, the Internet, an intranet or any other suitable type of network. In particular embodiments, network 210 may include one or more routers for routing data between clients 220 and/or servers 240. A device (e.g., a client 220 or a server 240) on network 210 may be addressed by a corresponding network address including, for example, an Internet protocol (IP) address, an Internet name, a Windows Internet name service (WINS) name, a domain name or other system name. In particular embodiments, network 210 may include one or more logical groupings of network devices such as, for example, one or more sites (e.g., customer sites) or subnets. As an example, a corporate network may include potentially thousands of offices or branches, each with its own subnet (or multiple subnets) having many devices. One or more clients 220 may communicate with one or more servers 240 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Client 220 may be a desktop computer, a laptop computer, a tablet computer, a handheld device, a mobile phone, a kiosk, a vending machine, a billboard, or any suitable information handling system. In particular embodiments, a client 220 is an embedded computer and may have flash memory (e.g., a solid state drive) instead of a hard disk drive. In particular embodiments, a client 220 is a thin client having limited processing capabilities and limited storage, and such a thin client may require minimal management and updates. A client 220 may communicate with a server 240 via one or more protocols such as Hypertext Transfer Protocol (HTTP), Hypertext Transfer Protocol Secure (HTTPS), File Transfer Protocol (FTP), Common Internet File System (CIFS), Independent Computing Architecture (ICA) protocol (developed by Citrix Systems, Inc.), Remote Desktop Protocol (RDP) (developed by Microsoft Corporation), or any suitable protocol or combination of protocols. A client 220 may be an RDP client.

A server 240 may include one or more of: a computing device, a desktop computer, a laptop computer, a database, a corporate server, a repository server, a configuration application server, a domain name system (DNS) server, a dynamic host configuration protocol (DHCP) server, a virtual machine (e.g., VMware® Virtual Machine), a desktop session (e.g., Microsoft Terminal Server), a published application (e.g., Microsoft Terminal Server), or any suitable information handling system. As an example, a private (e.g., corporate) network may include a device manager server and a repository server each configured to communicate with multiple clients 220 across one or more domains, sites, or subnets of network 210. In particular embodiments, a server 240 may include one or more servers, or functions of one or more servers. A client 220 may access software resources provided by a server 240 such as, for example, operating systems, add-ons, content, or any other suitable data, applications, or images. In particular embodiments, a client 220 may access resources provided by a server 240 only after providing suitable authentication information. Alternatively, a server 240 may provide software or other resources automatically to one or more clients 220.

It may be desirable, in the case of a private (e.g., corporate) network including multiple sites or subnets to deploy software (including, e.g., all or part of one or more operating systems, applications, add-ons, or data) to one or more clients 220 across one or more sites or subnets. The clients 220 may, for example, be located remotely from one or more servers 240 (including, e.g., device managers or resource repositories), and as such, there may be challenges in deploying software or other resources to the client devices. As an example, limited connectivity or limited speed due to bandwidth constraints or network latencies may create delays in deploying software. As another example, remote sites or subnets may not include managed components or may not have any personnel with information technology expertise necessary to implement software deployment to client devices at the sites or subnets. Additionally, as the size of operating system images or other content (e.g., videos) increases, deploying software or other data to remote sites or subnets may be further delayed. These issues may be further exacerbated in the case of embedded computers such as thin clients, which may have limited processing capability and limited storage space. Traditional approaches involving using a static remote software repository for each subnet or site may not be feasible due to cost or management and monitoring requirements.

In particular embodiments, one or more servers 240 of a network 210 may include a device manager that may manage one or more clients 220 (e.g., thin clients) of one or more sites or subnets of the network. The device manager may, for example, be a software-based management tool that allows for software imaging, software updates, and software configurations to be deployed to the clients from one or more servers. The device manager may also perform any other suitable management function to manage client devices including, for example, enabling or performing (e.g., automatically) device discovery, tracking of assets (e.g., hardware or software inventory) at client devices, monitoring the status or health of client devices, applying one or more policies to client devices (including, e.g., network settings of the client devices), or remote administration and shadowing of client devices. The device manager may deliver any suitable resources including, for example, operating systems, add-ons, content, or any other suitable data, applications, or images to one or more thin clients 220 of network 210.

In particular embodiments, a client device such as client 220 (e.g., a thin client) may be designed with minimal or limited storage capacity (e.g., in a hard disk). The client device may be required, however, to run an operating system such as WINDOWS EMBEDDED or WINDOWS SERVER, but the footprint of such an operating system may grow over time with newer releases or updates. Hence, client devices may, over time, begin to run low on free storage space (e.g., in the hard disk). Unwanted files may be deleted or full volume compression of the storage medium (e.g., the hard disk) may be implemented to increase available storage space. However, full volume compression may introduce performance shortcomings (e.g., increased number of instruction cycles required to compress/uncompress data in the volume) from the point of view of an end user of the client 220. In particular embodiments, optimized volume compression may be implemented to reduce effective disk usage on a client device while minimizing impact on system performance.

Figure 3:
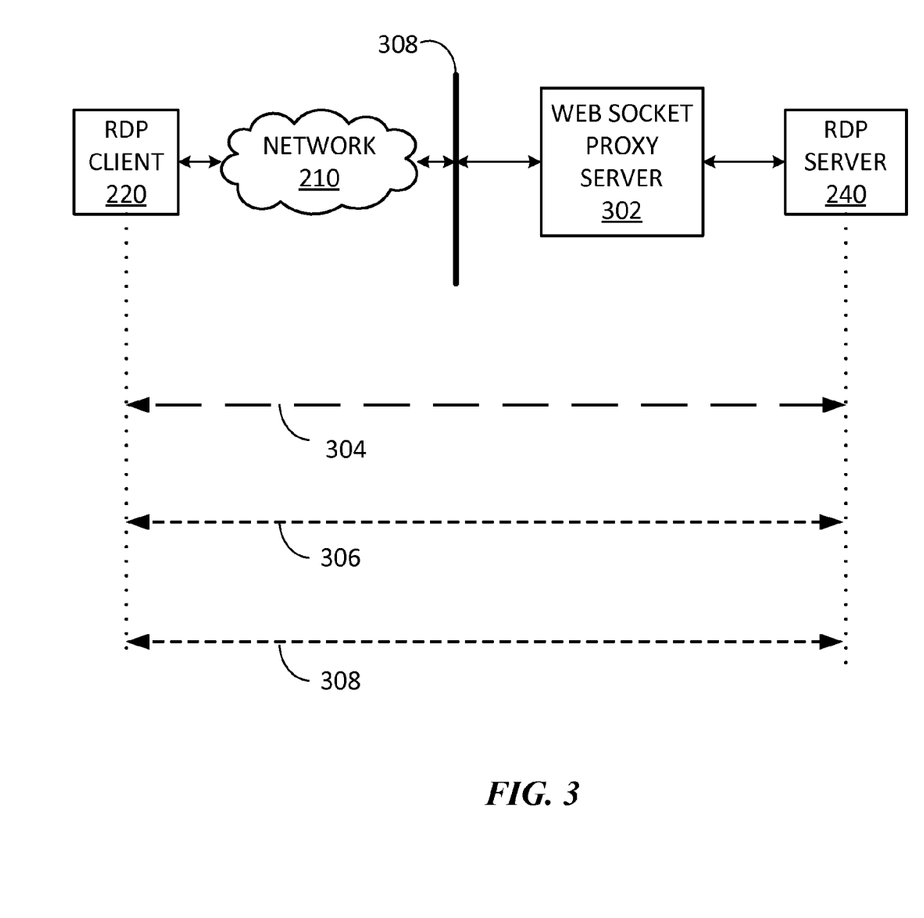
FIG. 3 is an example of a network environment utilizing Remote Desktop Protocol according to one or more embodiments of the present disclosure.

FIG. 3 illustrates a network environment utilizing an application that has virtual channels, which is a means to provide data pathway using a provision of an existing protocol. As an example and not by way of limitation, such an application may be a RDP client. In particular embodiments, RDP client 220 may be a personal computer, a laptop computer, a thin client, a mobile device, or any other information handling system with an RDP client protocol implementation. In particular embodiments, RDP client 220 may be associated with one or more sites (e.g., subnets) of network 210. In particular embodiments, communication to servers 240 may occur through one or more trusted and secure private networks. As an example and not by way of limitation, the trusted and secure private networks may be associated with one or more enterprise networks. In particular embodiments, RDP client 220 of network 210 may not be secure or trusted. For example, RDP client 220 may be a customer's device, a website visitor's device, or an employee's device (such as in a "bring your own device" environment). As an example and not by way of limitation, network 210 may comprise a public network, such as the Internet, or a third-party network. Network 210 may be untrusted, for example the network may have substantially low security. In order to protect RDP servers 240 against potential security threats from network 210 and RDP client 220, a firewall 308 may establish one or more barriers that screen incoming and outgoing data traffic between RDP servers 240 and RDP client 220. In particular embodiments, firewall 308 may comprise one or more of a software-based network security system or a hardware-based network security system that screen the data traffic according to one or more pre-determined routing rule-sets. In particular embodiments, firewall 308 may comprise one or more network security systems developed by Microsoft Corporation. Furthermore, servers 240 may be deployed using Microsoft Enterprise servers. Herein, reference to the network security systems developed by Microsoft Corporation includes, but is not limited to, Microsoft Enterprise-based firewalls.

In one or more embodiments, a web socket proxy server 302 facilitates communications from an RDP client 220 via network 210 to RDP server 240. In particular embodiments, RDP server 240 may be a Microsoft Windows server providing Remote Desktop Services. In particular embodiments, RDP server 240 may comprise a device manager that manages RDP client 220, as described above. In particular embodiments, one or more RDP servers 240 may include one or more services that a client-side operation may desire to connect to, or other servers that provide services to be accessed by a client, such as RDP client 220, applications co-located with RDP client 220, a port-forward within RDP client 220, or virtual network through RDP client 220. For example, RDP servers 240 may comprise Microsoft Windows servers, Microsoft Enterprise servers, UNIX/LINUX servers, etc. Examples of services provided by RDP servers 240 include, but are not limited to, file sharing, video streaming, audio streaming, database access, instant messaging, telephony, or video conferencing.

RDP client 220 may create one or more RDP virtual channels 304 between RDP server 240 and RDP client 220 over an established RDP connection. An application at the RDP server 240 may then communicate with RDP client 220 through the virtual channel 304. Virtual channel 304 may be utilized to stream video data that includes both audio and video. For example, a user may desire to play an audio stream provided by an RDP server 240 using an audio player application concurrently running on RDP client device 220. To provide access to the remote audio stream, a gateway client located within RDP client device 220 may establish a tunnel and channel using a specialized gateway service attachment through RDP virtual channel 304 to RDP server 240. The RDP server 240 may utilize a plug-in that converts all video files to be sent to RDP client 220 as a video streaming data with virtual channel tags. In one embodiment, more than one virtual channel is established. For example, audio may be communicated over virtual channel 306 while video is communicated over virtual channel 308. Virtual channels 306 and 308 may be a subset of virtual channel 304 such that only one virtual channel is established between RDP client 220 and RDP server 240. In one embodiment, the audio data or the video data may have higher priority. For example, video data may have a higher priority than the audio data. When the RDP client 220 receives the video data it runs the video data through a queue and determines that the video data has a high priority so RDP client 220 adds the video data to a video worker thread and then adds the audio data to an audio worker thread.

In particular embodiments, as described in connection with FIG. 4, an RDP client 220 may be implemented in a web browser, for example, a standards-based web browser. A web-socket server may be used to connect the RDP client implemented in a web browser to the RDP server.

Figure 4:
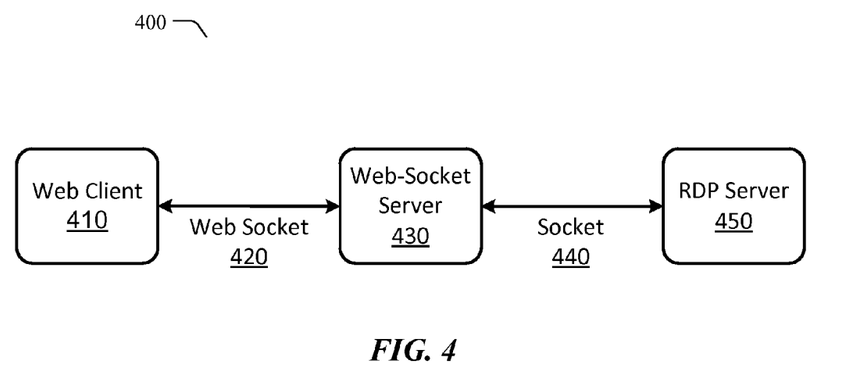
FIG. 4 is an example web-socket server environment according to one or more embodiments of the present disclosure.

FIG. 4 is an example web socket server environment 400. In particular embodiments, web socket server environment 400 may include a web client 410, web socket 420, web-socket server 430, socket 440, and RDP server 450. In particular embodiments, web client 410 may correspond to RDP client 220 and RDP server 450 may correspond to any one or any combination of RDP servers 240, described in connection with FIG. 3. Web client 410 may be a web browser, such as a standards-based web browser. Web-socket server 430 may be a proxy server (such as web socket proxy server 302), and web-socket server 430 may be implemented in C or C++ code.

Web-socket server 430 may facilitate connections between RDP server 450 and web client 410. Web client 410 may send one or more packets, for example, JAVASCRIPT packets, Protocol Data Units (PDUs), or any other suitable packets, over web socket 420. Web-socket server 430 may intercept the packets sent from web client 410 over web socket 420 and convert each packet into a socket format, which RDP server 450 may understand. Web-socket server 430 may open a socket 440 that connects with RDP server 450 and send the converted packets (e.g., in socket format) to RDP server 450 over socket 440. In particular embodiments, web-socket server 430 may intercept packets sent from RDP server 450 over socket 440, which may be in socket format. Web-socket server 430 may convert the packets into a web-socket format and send the converted packets over web socket 420 to web client 410. In this manner, web-socket server 430 may facilitate data transmissions and any other suitable communications between web client 410 and RDP server 450. The packets communicated to web client 410 may include instructions that cause web client 410 to act as an RDP client or to provide an RDP client, which may mean that the web client 410 may provide a graphical interface for presenting and interacting with a remote desktop. RDP server 450 may provide the remote desktop, which may be published to the web client 410 using an RDP via the connection facilitated by web-socket server 430.

Web client 410, web socket 420, web-socket server 430, socket 440, and RDP server 450 may perform any of the functions and have any of the attributes described in U.S. patent application Ser. No. 14/925,582 titled "Remote Desktop Protocol Client for a Standards-Based Web Browser," filed Oct. 28, 2015, which is incorporated by reference herein.

In particular embodiments, RDP server 450, web-socket server 430, web client 410, or any combination thereof, may provide a platform to implement one or more virtual channels. A virtual channel may correspond to, for example, virtual channel 304, as described in connection with FIG. 3. A virtual channel may be, for example, a way to implement plug-in functionality into RDP. Each virtual channel may be associated with a web worker (i.e., worker thread), and each web worker may be a JAVASCRIPT that runs independently and in the background of web client 410 so that the web workers do not interfere with the performance of an RDP client implemented by web client 410.

In particular embodiments, when RDP server 450 is establishing a connection with web client 410 via web-socket server 430, RDP server 450 and web client 410 may engage in a capabilities exchange. Specifically, RDP server 450 may query the capabilities of the web client 410. Web client 410 may have capabilities that include, for example, an ADOBE FLASH plug-in, ADOBE ACROBAT plug-in, any other suitable PDF viewer plug-in, permission to write to the local file system of a client system 130 on which web client 410 is running, any other suitable plug-ins or functionalities, or any combination thereof. The capabilities of the web client 410 may be determined based on the DOM or plug-ins of web client 410 or using any other suitable method for determining the functions of web client 410. The virtual channels may be created in accordance with and may be limited by the determined capabilities of web client 410. Web client 410 may send to RDP server 450 a packet (for example, a Protocol Data Unit (PDU)) that includes an indication of the capabilities of web client 410. RDP server 450 may identify one or more applications on a remote machine to be accessed by the web client (for example, accessed via RDP). RDP server 450 may determine which virtual channels are to be created based on the determined capabilities of web client 410 and the identified applications of the remote machine. RDP server 450 may then provide a virtual channel for each of the capabilities of the standards-based web browser of web client 410 for which a corresponding application on the remote machine requires. RDP server 450 may provide the virtual channels over socket 440. Web client 410 may receive from RDP server 450, indications of the virtual channels created by RDP server 450, and web client 410 may assign a worker thread to each virtual channel to handle the processing associated with the respective virtual channel. If a particular virtual channel requires access to the DOM of web client 410, then web client 410 may implement the virtual channel on a main processing thread. The virtual channels may be provided to facilitate the generation of an interface for viewing and interacting with content of the remote machine at web client 410.

Although this disclosure describes and illustrates particular embodiments of FIG. 4 as being implemented by RDP server 450, this disclosure contemplates any suitable embodiments of FIG. 4 occurring on any suitable interface and as being implemented by any suitable platform or system. As an example, and not by way of limitation, particular embodiments of FIG. 4 may be implemented by web client 410. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
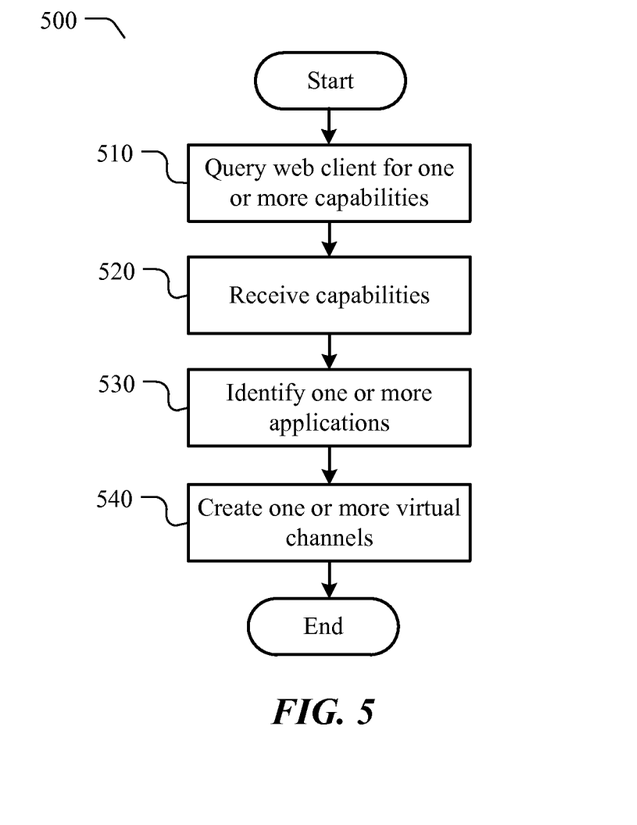
FIG. 5 is an example method for providing a remote desktop protocol client with virtual channel support for a standards-based web browser at a remote desktop protocol client according to one or more embodiments of the present disclosure.

FIG. 5 illustrates an example method 500 providing an RDP client 220 with virtual channel support for a standards-based web browser. The method may begin at step 510, where RDP server 450 may query web client 410 for the one or more capabilities of a standards-based web browser at the web client 410. The one or more capabilities may correspond to one or more plug-ins available for use at web client 410. At step 520, RDP server 450 may receive a packet from web client 410 that indicates the one or more capabilities available at web client 410. The format of the packet may be in any format known to one of ordinary skill in the art. In one embodiment, one or more packets are sent to provide the RDP server 450 with the capabilities of the web client 410.

At step 530, RDP server 450 may identify one or more applications running on a remote machine that may be accessed by web client 410. The remote machine may be a client 220 such as another RDP client 220 or any other information handling system 100, or any other computing device known to one of ordinary skill in the art. At step 540, RDP server 450 may provide or create one or more virtual channels between RDP server 450 and web client 410. Each of the one or more virtual channels are associated with a capability of web client 410 that corresponds to a capability required by an identified application. For example, a virtual channel needs to be established if an application requests to play audio to allow the playback of the audio on the client 220 instead of at the server 240. In another example, a virtual channel may be established so that microphone input may be redirected from a client 220 to a remote application. The virtual channels provided by the web server 450 facilitate the generation of an interface at the web client 410 for viewing and interacting with content of the remote machine at web client 410.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for providing a remote desktop protocol client with virtual channel support for a standards-based web client 410, including the particular steps of the method of FIG. 5 this disclosure contemplates any suitable method for providing a remote desktop protocol client with virtual channel support for a standards-based web client 410, including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
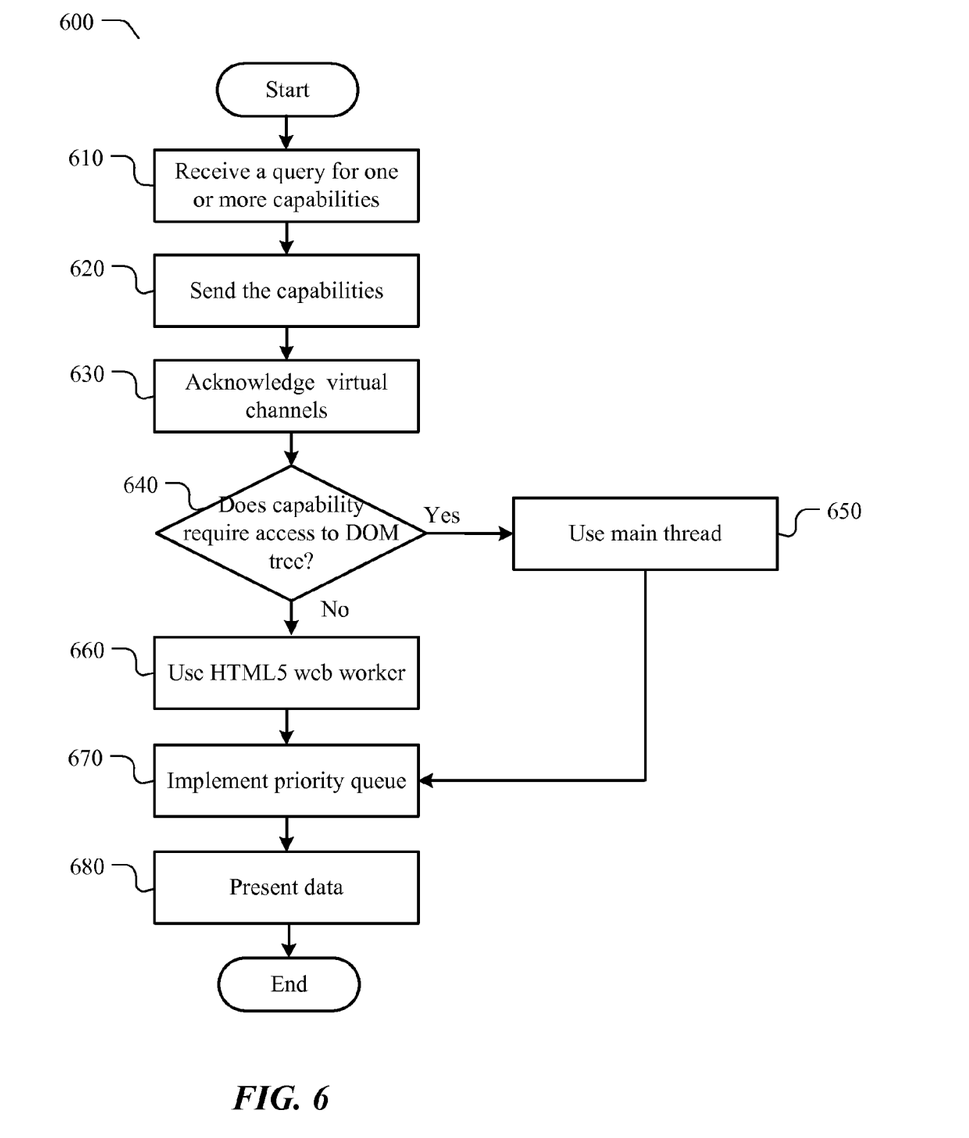
FIG. 6 is an example method for implementing virtual channel support for a standards-based web browser at a remote desktop protocol client.

FIG. 6 illustrates an example method 500 implementing virtual channel support for a standards-based web browser at an RDP client 220. At step 610, the web client 410 (or RDP client 220) receives a query from RDP server 450 for one or more capabilities of the web client 410. The one or more capabilities may be associated with one or more plug-ins available to the standards-based web browser of the web client 410. At step 620, the web client 410 sends the one or more capabilities to the RDP server 450. At step 630, the web client 410 acknowledges the creation of the one or more virtual channels created by the web server 450. Acknowledging the virtual channels may comprise implementing a cross-platform scripting language client that handles the virtual channels created by the web server 450 for the web client 410.

At step 640, the web client 410 determines if a given capability for a particular virtual channel requires access to the DOM tree. If the virtual channel requires access to the DOM tree, then at step 650, the virtual channel is implemented on the main processing thread of the cross-platform scripting language client. If the virtual channel does not require access to the DOM tree, then at step 660, then the cross-platform scripting language client uses an HTML5 web worker to implement the virtual channel. Both steps 650 and 660 may continue to step 670 where a priority queue is implemented. Next, at step 680, any data that has been received on a virtual channel that needs to be presented by the standards-based web browser at the web client 410 is presented.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Those of skill in the art would appreciate that items such as the various illustrative blocks, modules, elements, components, methods, operations, steps, and algorithms described herein may be implemented as hardware, computer software, or a combination of both.

To illustrate the interchangeability of hardware and software, items such as the various illustrative blocks, modules, elements, components, methods, operations, steps, and algorithms have been described generally in terms of their functionality. Whether such functionality is implemented as hardware or software depends upon the particular application and design constraints imposed on the overall system. Skilled artisans may implement the described functionality in varying ways for each particular application.

In one aspect, "means," a block, a module, an element, a component or a processor may be an item (for example, one or more of blocks, modules, elements, components or processors) for performing one or more functions or operations. In one aspect, such an item may be an apparatus, hardware, or a portion thereof. In one example, an item may have a structure in the form of, for example, an instruction(s) encoded or stored on a machine-readable medium, on another device, or on a portion thereof. An instruction(s) may be software, an application(s), a subroutine(s), or a portion thereof. The instructions(s) may be for performing the function(s) or operation(s). The instruction(s) may be executable by one or more processors to perform the function(s) or operation(s). One or more processors may execute the instruction(s) by, for example, transferring or copying and instructions into an executable memory space and executing the instructions. In one example, an item may be implemented as one or more circuits configured to perform the function(s) or operation(s). A circuit may include one or more circuits and/or logic. A circuit may be analog and/or digital. A circuit may be electrical and/or optical. A circuit may include transistors. In an example, one or more items may be implemented as a processing system (for example, a digital signal processor (DSP), an application specific integrated circuit (ASIC), a field programmable gate array (FPGA), etc.), as a portion(s) of any of the foregoing, or as a combination(s) of any of the foregoing. Those skilled in the art will recognize how to implement the instructions, circuits, and processing systems.

In one aspect of the disclosure, when actions or functions (for example, hooking, modifying, intercepting, redirecting, determining, traversing, obtaining, creating, operating, deleting, removing, receiving, providing, generating, converting, displaying, notifying, accepting, selecting, controlling, transmitting, reporting, sending, or any other action or function) are described as being performed by an item (for example, one or more of blocks, modules, elements, components or processors), it is understood that such actions or functions may be performed, for example, by the item directly. In another example, when an item is described as performing an action, the item may be understood to perform the action indirectly, for example, by facilitating such an action (for example, assisting, allowing, enabling, causing, or providing for, such action to occur; or performing a portion of such an action). For example, determining can refer to facilitating determination, attaching can refer to facilitating attaching, and receiving can refer to facilitating receiving. In one aspect, performing an action may refer to performing a portion of the action (for example, performing a beginning part of the action, performing an end part of the action, or performing a middle portion of the action).

A reference to an element in the singular is not intended to mean "one and only one" unless specifically so stated, but rather "one or more." For example, a client may refer to one or more clients, a server may refer to one or more servers, an operation may refer to one or more operations, and a signal, message, or communication may refer to one or more signals, messages, or communications.

Unless specifically stated otherwise, the term "some" refers to one or more. Pronouns in the masculine (for example, his) include the feminine and neuter gender (for example, her and its) and vice versa. Headings and subheadings, if any, are used for convenience only and do not limit the invention.

A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, the term "coupled" or the like may refer to being directly coupled. In another aspect, the term "coupled" or the like may refer to being indirectly coupled or communicatively coupled.

Various items may be arranged differently (for example, arranged in a different order, or partitioned in a different way) all without departing from the scope of the subject technology. In one aspect of the disclosure, the elements recited in the accompanying claims may be performed by one or more modules or sub-modules.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by a remote desktop protocol (RDP) server:
   querying a web client to determine one or more capabilities of a standards-based web browser of the web client;
   receiving a packet from the web client, the packet comprising an indication of the one or more capabilities available at the web client;
   identifying one or more applications running on a remote machine to be accessed by the web client;
   providing one or more virtual channels between the RDP server and the web client, wherein the one or more virtual channels are each associated with at least one of the one or more capabilities that corresponds to at least one of the one or more applications, and wherein the virtual channels are provided to facilitate generation of an interface for viewing and interacting with content of the remote machine at the web client; and
   implementing the one or more virtual channels using at least one of one or more web workers and a main processing thread of a cross-platform scripting language, wherein the each of the one or more virtual channels is associated with a corresponding web worker of the one or more web workers.

2. The method of claim 1, wherein the received packet comprises a plurality of packets.

3. The method of claim 1, wherein the received packet is received over a websocket connection.

4. The method of claim 1, wherein at least one of the one or more capabilities received in the packet is associated with a plug-in available to the standards-based web browser of the web client.

5. The method of claim 1, wherein the querying occurs during a capabilities exchange between the RDP server and the web client.

6. The method of claim 1, wherein the one or more virtual channels are limited by the one or more capabilities.

7. The method of claim 1, wherein the packet is a Protocol Data Unit.

8. One or more computer-readable non-transitory storage media embodying software that is operable when executed to:
  query a web client to determine one or more capabilities of a standards-based web browser of the web client;
  receive a packet from the web client at a Remote Desktop Protocol (RDP) server, the packet comprising an indication of the one or more capabilities available at the web client;
  identify one or more applications running on a remote machine to be accessed by the web client; and
  provide one or more virtual channels between the RDP server and the web client, wherein the one or more virtual channels are each associated with at least one of the one or more capabilities that corresponds to at least one of the one or more applications, and wherein the virtual channels are provided to facilitate generation of an interface for viewing and interacting with content of the remote machine at the web client; and
  implement the one or more virtual channels using at least one of one or more web workers and a main processing thread of a cross-platform scripting language, wherein the each of the one or more virtual channels is associated with a corresponding web worker of the one or more web workers.

9. The media of claim 8, wherein the received packet comprises a plurality of packets.

10. The media of claim 8, wherein the received packet is received over a websocket connection.

11. The media of claim 8, wherein at least one of the one or more capabilities received in the packet is associated with a plug-in available to the standards-based web browser of the web client.

12. The media of claim 8, wherein the querying occurs during a capabilities exchange between the RDP server and the web client.

13. The media of claim 8, wherein, the one or more virtual channels are limited by the one or more capabilities.

14. An information handling system comprising: one or more processors; and a memory coupled to the processors comprising instructions executable by the processors, the processors operable when executing the instructions to:
  query a web client to determine one or more capabilities of a standards-based web browser of the web client;
  receive a packet from the web client at a Remote Desktop Protocol (RDP) server, the packet comprising an indication of the one or more capabilities available at the web client;
  identify one or more applications running on a remote machine to be accessed by the web client; and
  provide one or more virtual channels between the RDP server and the web client, wherein the one or more virtual channels are each associated with at least one of the one or more capabilities that corresponds to at least one of the one or more applications, and wherein the virtual channels are provided to facilitate generation of an interface for viewing and interacting with content of the remote machine at the web client; and
  implement the one or more virtual channels using at least one of one or more web workers and a main processing thread of a cross-platform scripting language, wherein the each of the one or more virtual channels is associated with a corresponding web worker of the one or more web workers.

15. The information handling system of claim 13, wherein the received packet comprises a plurality of packets.

16. The information handling system of claim 13, wherein the received packet is received over a websocket connection.

17. The information handling system of claim 13, wherein at least one of the one or more capabilities is associated with a plug-in available to the standards-based web browser of the web client.

18. The information handling system of claim 13, wherein the querying occurs during a capabilities exchange between the RDP server and the web client.

19. The information handling system of claim 13, wherein the one or more virtual channels are limited by the one or more capabilities.

20. The information handling system of claim 15, wherein the packet is a Protocol Data Unit.

* * * * *